(12) United States Patent
Tokunaga

(10) Patent No.: US 11,064,078 B2
(45) Date of Patent: Jul. 13, 2021

(54) INFORMATION PROCESSING SYSTEM, USER TERMINAL, AND ELECTRONIC APPARATUS

(71) Applicant: KYOCERA DOCUMENT SOLUTIONS INC., Osaka (JP)

(72) Inventor: Tomoharu Tokunaga, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 16/868,684

(22) Filed: May 7, 2020

(65) Prior Publication Data

US 2020/0366799 A1  Nov. 19, 2020

(30) Foreign Application Priority Data

May 15, 2019  (JP) .............................. JP2019-092195

(51) Int. Cl.
*H04N 1/00* (2006.01)

(52) U.S. Cl.
CPC ..... *H04N 1/00214* (2013.01); *H04N 1/00244* (2013.01)

(58) Field of Classification Search
CPC ............ H04N 1/00214; H04N 1/00244; G06F 3/1222; G06F 3/1231; G06F 3/1229; G06F 3/1236; G06F 3/1286
USPC ....................................................... 358/1.15
See application file for complete search history.

(56) References Cited

U.S. PATENT DOCUMENTS

| | | | | |
|---|---|---|---|---|
| 2008/0046708 | A1* | 2/2008 | Fitzgerald | G06F 8/63 713/2 |
| 2009/0214011 | A1* | 8/2009 | Geldbach | H04M 15/82 379/111 |
| 2009/0323581 | A1* | 12/2009 | Masuda | H04M 3/20 370/315 |
| 2009/0327486 | A1* | 12/2009 | Andrews | H04L 67/1027 709/224 |
| 2012/0127523 | A1* | 5/2012 | Terashita | G06F 3/1285 358/1.15 |

(Continued)

FOREIGN PATENT DOCUMENTS

JP  2013082142 A  5/2013

Primary Examiner — Jerome Grant, II
(74) Attorney, Agent, or Firm — Li & Cai Intellectual Property (USA) Office

(57) ABSTRACT

A user terminal includes a memory device configured to store a connection setting value and a manager service, the connection setting value being used to connect to a service in an external network by an extended application of the electronic apparatus, the manager service causing the user terminal to send the connection setting value to the electronic apparatus, and a controller circuitry configured to control the communication device to send second communication to the electronic apparatus when the communication device receives the first communication, the second communication indicating that the manager service is ready to send the connection setting value to the electronic apparatus, and control the communication device to send fourth communication to the electronic apparatus when the communication device receives third communication from the electronic apparatus, the third communication requesting to send the connection setting value, the fourth communication sending the connection setting value.

5 Claims, 4 Drawing Sheets

(56) References Cited

U.S. PATENT DOCUMENTS

| | | | |
|---|---|---|---|
| 2013/0205354 A1* | 8/2013 | Balaji | H04N 21/472 |
| | | | 725/88 |
| 2013/0232275 A1* | 9/2013 | Beres | H04L 41/0659 |
| | | | 709/228 |
| 2015/0289002 A1* | 10/2015 | Choi | H04N 21/25891 |
| | | | 725/19 |
| 2017/0180763 A1* | 6/2017 | Lee | H04N 21/4882 |
| 2017/0238213 A1* | 8/2017 | Bezawada | H04L 69/16 |
| | | | 370/331 |
| 2017/0300277 A1* | 10/2017 | Kosuda | H04L 61/2007 |
| 2018/0212974 A1* | 7/2018 | Onoda | H04L 63/0876 |
| 2018/0330308 A1* | 11/2018 | Ahmed | G06Q 10/06312 |
| 2019/0109815 A1* | 4/2019 | Nandan | H04W 8/26 |
| 2019/0274086 A1* | 9/2019 | Cui | H04W 4/70 |
| 2019/0327406 A1* | 10/2019 | Tokunaga | H04N 5/23296 |
| 2020/0084313 A1* | 3/2020 | Koizumi | H04W 12/06 |
| 2020/0146077 A1* | 5/2020 | Li | H04W 76/10 |
| 2020/0403911 A1* | 12/2020 | Singhal | H04L 67/16 |

* cited by examiner

INFORMATION PROCESSING SYSTEM, USER TERMINAL, AND ELECTRONIC APPARATUS

CROSS-REFERENCE TO RELATED PATENT APPLICATION

This application claims the benefit of Japanese Priority Patent Application JP 2019-092195 filed May 15, 2019, the entire contents of which are incorporated herein by reference.

FIELD OF THE DISCLOSURE

The present disclosure relates to an information processing system, a user terminal, and an electronic apparatus.

FIELD OF THE DISCLOSURE

There is known a technology in which an image forming apparatus obtains mobile terminal information from a terminal, and use of the image forming apparatus via the terminal based on the mobile terminal information is temporarily allowed.

SUMMARY OF THE DISCLOSURE

It is desirable for an electronic apparatus, which executes an extended application that uses a service in an external network, to be user-friendly and to have a higher security.

According to the present disclosure, there is provided an information processing system, including:
 a user terminal; and
 an electronic apparatus communicably connected to the user terminal,
 the user terminal including
  a memory device configured to store a connection setting value and a manager service, the connection setting value being used to connect to a service in an external network by an extended application of the electronic apparatus, the manager service causing the user terminal to send the connection setting value to the electronic apparatus,
  a communication device configured to receive first communication from the electronic apparatus, the first communication being for searching for the manager service, and
  a controller circuitry configured to
   control the communication device to send second communication to the electronic apparatus when the communication device receives the first communication, the second communication indicating that the manager service is ready to send the connection setting value to the electronic apparatus, and
   control the communication device to send fourth communication to the electronic apparatus when the communication device receives third communication from the electronic apparatus, the third communication requesting to send the connection setting value, the fourth communication sending the connection setting value,
 the electronic apparatus including
  a memory device configured to store the extended application,
  a communication device configured to send the first communication when the electronic apparatus starts the extended application, and
  a controller circuitry configured to
   where the communication device receives the second communication from one or more manager services, control to display a list of the one or more manager services that sent the second communication,
   control the communication device to send the third communication to a manager service displayed on the list and selected by a user, and
   where the connection setting value is received via the fourth communication, control the extended application to execute fifth communication, the fifth communication connecting to the service in the external network by using the connection setting value.

According to the present disclosure, there is provided a user terminal communicably connected to an electronic apparatus,
 the user terminal including
  a memory device configured to store a connection setting value and a manager service, the connection setting value being used to connect to a service in an external network by an extended application of the electronic apparatus, the manager service causing the user terminal to send the connection setting value to the electronic apparatus,
  a communication device configured to receive first communication from the electronic apparatus, the first communication being for searching for the manager service, and
  a controller circuitry configured to
   control the communication device to send second communication to the electronic apparatus when the communication device receives the first communication, the second communication indicating that the manager service is ready to send the connection setting value to the electronic apparatus, and
   control the communication device to send fourth communication to the electronic apparatus when the communication device receives third communication from the electronic apparatus, the third communication requesting to send the connection setting value, the fourth communication sending the connection setting value,
 the electronic apparatus including
  a memory device configured to store the extended application,
  a communication device configured to send the first communication when the electronic apparatus starts the extended application, and
  a controller circuitry configured to
   where the communication device receives the second communication from one or more manager services, control to display a list of the one or more manager services that sent the second communication,
   control the communication device to send the third communication to a manager service displayed on the list and selected by a user, and
   where the connection setting value is received via the fourth communication, control the extended application to execute fifth communication, the fifth communication connecting to the service in the external network by using the connection setting value.

According to the present disclosure, there is provided an electronic apparatus communicably connected to a user terminal, the user terminal including
- a memory device configured to store a connection setting value and a manager service, the connection setting value being used to connect to a service in an external network by an extended application of the electronic apparatus, the manager service causing the user terminal to send the connection setting value to the electronic apparatus,
- a communication device configured to receive first communication from the electronic apparatus, the first communication being for searching for the manager service, and
- a controller circuitry configured to
  - control the communication device to send second communication to the electronic apparatus when the communication device receives the first communication, the second communication indicating that the manager service is ready to send the connection setting value to the electronic apparatus, and
  - control the communication device to send fourth communication to the electronic apparatus when the communication device receives third communication from the electronic apparatus, the third communication requesting to send the connection setting value, the fourth communication sending the connection setting value, the electronic apparatus including
- a memory device configured to store the extended application,
- a communication device configured to send the first communication when the electronic apparatus starts the extended application, and
- a controller circuitry configured to
  - where the communication device receives the second communication from one or more manager services, control to display a list of the one or more manager services that sent the second communication,
  - control the communication device to send the third communication to a manager service displayed on the list and selected by a user, and
  - where the connection setting value is received via the fourth communication, control the extended application to execute fifth communication, the fifth communication connecting to the service in the external network by using the connection setting value.

These and other objects, features and advantages of the present disclosure will become more apparent in light of the following detailed description of best mode embodiments thereof, as illustrated in the accompanying drawings.

DETAILED DESCRIPTION OF THE EXEMPLARY EMBODIMENTS

Hereinafter, an embodiment of the present disclosure will be described with reference to the drawings.

1. Image Forming System

Figure 1:
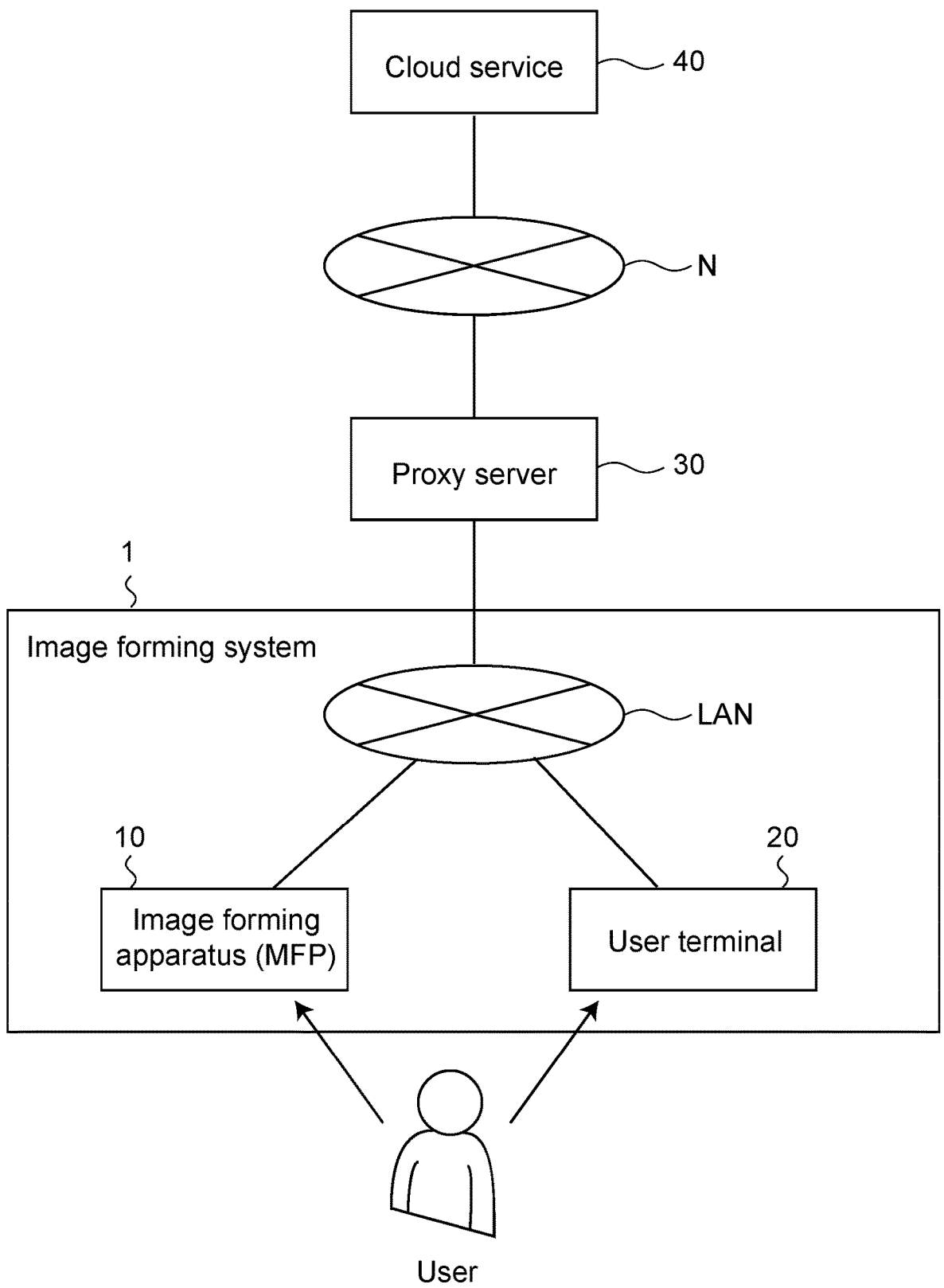
FIG. 1 shows an image forming system according to an embodiment of the present disclosure.

FIG. 1 shows an image forming system according to an embodiment of the present disclosure.

The image forming system 1 includes the image forming apparatus 10, the user terminal 20, and a LAN (local area network). The LAN connects the image forming apparatus 10 and the user terminal 20 communicably. The image forming apparatus 10 is, for example, a Multifunction Peripheral, i.e., MFP. The user terminal 20 is a personal device such as a laptop personal computer or a smartphone.

The proxy server 30 is also connected to the LAN, and interfaces connection to the external network N. The proxy server 30 has a hardware configuration of a computer. The external network N is, for example, the Internet.

The cloud service 40 is connected to the external network N. Typically, the cloud service 40 includes multiple network hosts and servers, and supplies various web services and SaaS (Software as a Service) functions in response to requests sent from an edge side (user side).

2. Hardware Configuration of Image Forming Apparatus

Figure 2:
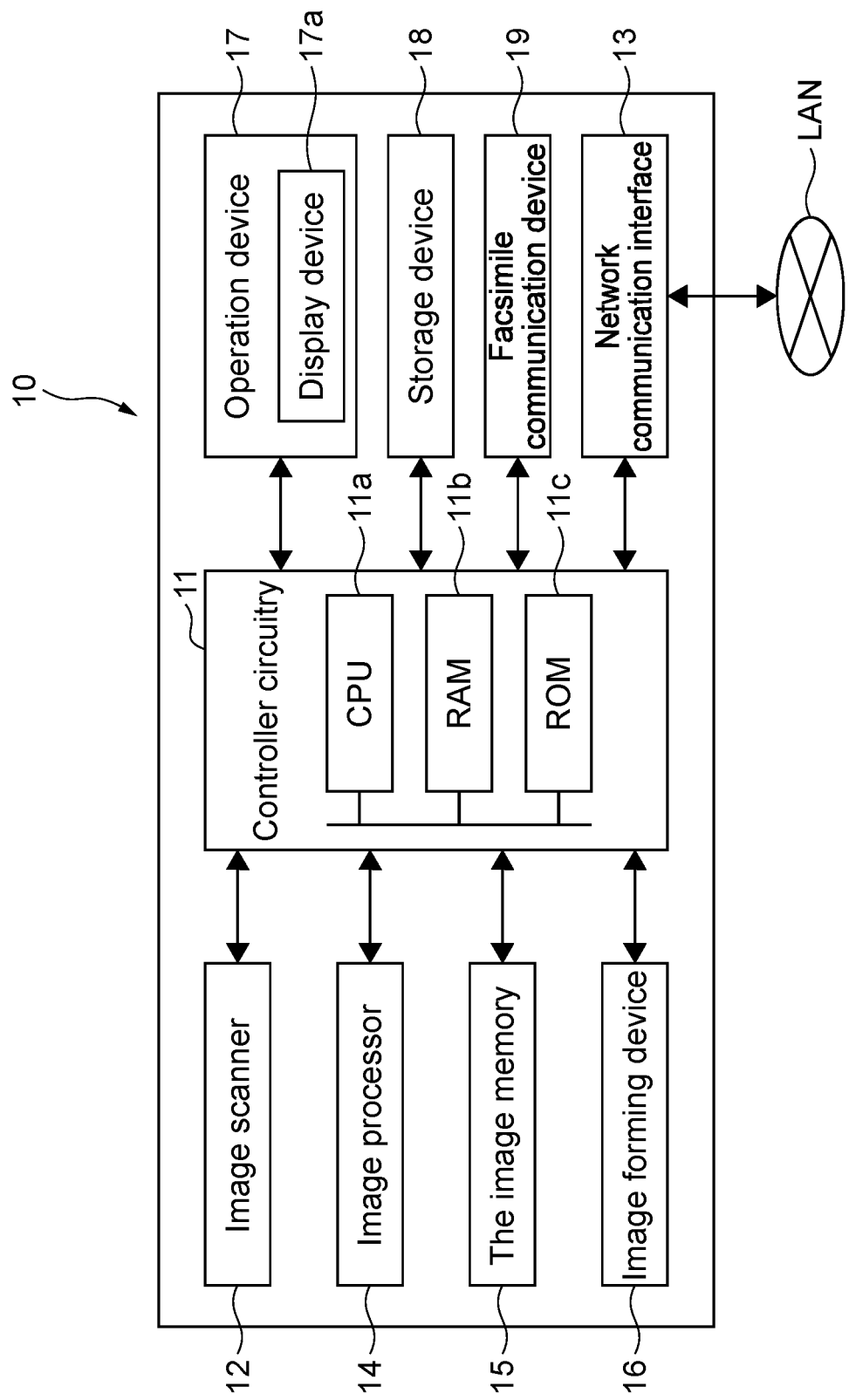
FIG. 2 shows a hardware configuration of an image forming apparatus.

FIG. 2 shows a hardware configuration of an image forming apparatus.

A hardware configuration of the image forming apparatus 10 will be described. The image forming apparatus 10 includes the controller circuitry 11. The controller circuitry 11 includes the CPU (Central Processing Unit) 11a, the RAM (Random Access Memory) 11b, the ROM (Read Only Memory) 11c, dedicated hardware circuitries, and the like and performs overall operational control of the electronic apparatus 10. The CPU 11a loads information processing programs stored in the ROM 11c in the RAM 11b and executes the information processing programs. The ROM 11c is a nonvolatile memory that stores programs executable by the CPU 11a, data, and the like. The ROM 11c is an example of a non-transitory computer readable recording medium.

The controller circuitry 11 is connected to the image scanner 12, the image processor 14 (including GPU (Graphics Processing Unit)), the image memory 15, the image forming device 16 (printer), the operation device 17 including the display device 17a (touch panel), the large volume nonvolatile storage device 18 such as an HDD (Hard Disk Drive) or an SSD (Solid State Drive), the facsimile communication device 19, the network communication interface 13, and the like. The controller circuitry 11 performs operational control of the respective devices connected thereto and sends/receives signals and data to/from those devices. The operation device 17 (touch panel) is one mode of an input device. A sound input device including a microphone may be provided as an input device.

3. Hardware Configuration of User Terminal

Figure 3:
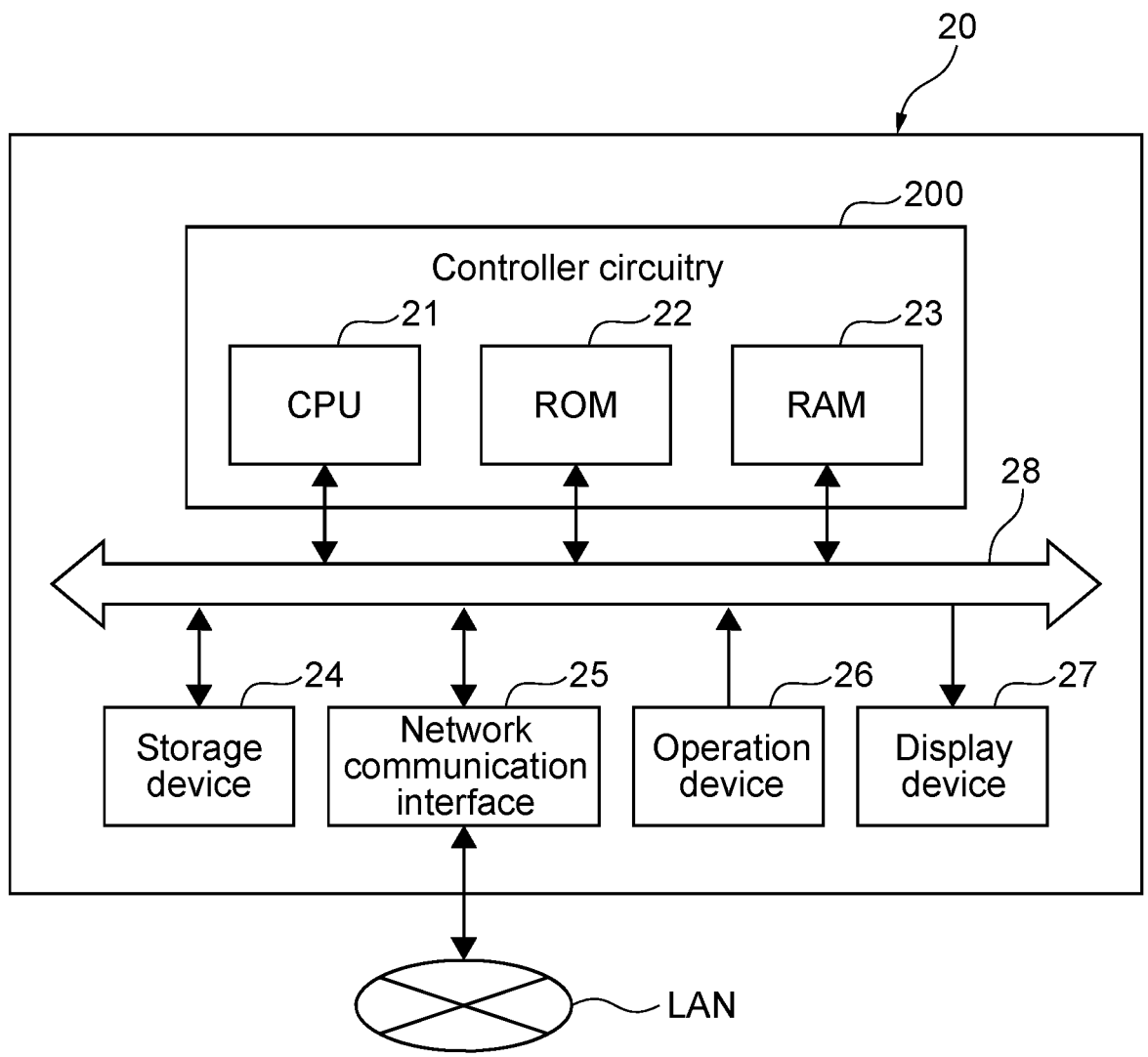
FIG. 3 shows a hardware configuration of a user terminal.

FIG. 3 shows a hardware configuration of a user terminal.

The user terminal 20 includes the CPU 21, the ROM 22, the RAM 23, the storage device 24, which is a large-volume nonvolatile memory such as an HDD or an SSD, the network communication interface 25, the operation device 26, and the display device 27, and the bus 28 connecting them to each other.

The controller circuitry 200 includes the CPU 21, the ROM 22, and the RAM 23. The CPU 21 loads information processing programs stored in the ROM 22 in the RAM 23 and executes the information processing programs. The ROM 22 stores programs executable by the CPU 21, data, and the like nonvolatile. The ROM 22 is an example of a non-transitory computer readable recording medium.

4. Functional Configurations of Image Forming Apparatus and User Terminal

Firstly, a functional configuration of the image forming apparatus 10 will be described.

The image forming apparatus 10 executes extended applications on a platform (described later). Thus the controller circuitry 11 functions as a "controller circuitry" of the image forming apparatus 10, and the network communication interface 13 functions as a "communication device" of the image forming apparatus 10. The storage device 18 and the ROM 11c function as a "memory device" of the image forming apparatus 10.

A software group called "platform", which includes an operating system (OS), prerequisite component software, and the like, is installed in the image forming apparatus 10. The platform supplies basic functions such as copying or facsimile.

Further, software called "extended application", which operates on the platform and extends functions supplied by the platform, is installed in the image forming apparatus 10 by a user. Specific examples of the extended applications include extended applications for a translation function, a file format conversion function, a device manager function, and the like.

Some extended applications use the cloud service 40 in the external network N. For example, an extended application (e.g., translation application) that uses the cloud service 40 in the external network N will be described. Firstly, a user wants to print a document file including text data, in which the text data part is translated into a foreign language. In this case, a document file is input in the image forming apparatus 10 according to a user operation. Then, the text data is input in the translation application, and the translation application accesses the cloud service 40 in the external network N. The translation application logs in to the cloud service by using an account of the user, causes the cloud service 40 to machine-translate the text data, and receives the output translated text. The image forming apparatus arranges the output translated text on the document, and prints and outputs the document.

Next, a functional configuration of the user terminal 20 will be described.

In the controller circuitry 200 of the user terminal 20, the CPU 21 loads an information processing program stored in the ROM 22 in the RAM 23 and executes the information processing program to function as the "controller circuitry". Controlled by the controller circuitry 200, the network communication interface 25 functions as the "communication device". Controlled by the controller circuitry 200, the storage device 24 functions as the "memory device".

The storage device 24 stores a "connection setting value" for each extended application installed in the image forming apparatus 10 and each user. The "connection setting value" is information used to connect to the cloud service 40 in the external network N by the image forming apparatus 10 and the extended application, and to use the service supplied by the cloud service 40. In the present embodiment, the "connection setting value" includes setting information of the proxy server 30 and login information for the cloud service 40. In this case, the setting information of the proxy server 30 is setting information that is used to use the proxy server 30 such as an IP address of the proxy server 30 in the LAN, for example.

Further, the "memory device" of the user terminal 20 stores a software program called "proxy server manager service". The proxy server manager service is an application executed by the user terminal 20.

When the proxy server manager service boots up, the proxy server manager service reads the connection setting value for each extended application and each user stored in the storage device 24, and stands by for communication from the image forming apparatus 10. The proxy server manager service receives a request to obtain a connection setting value from the image forming apparatus 10, and then sends the requested connection setting value to the image forming apparatus 10.

5. Functional Configuration of Proxy Server

The proxy server 30 is provided to protect the image forming system 1 from invalid entries and invalid use from outside. In the present embodiment, the proxy server 30 also functions as a gateway and a firewall from the LAN to the external network N.

The image forming apparatus 10 or the like is connected to the LAN behind the proxy server 30. A platform or each extended application installed the image forming apparatus 10 or the like uses the proxy server 30 by using the setting information of the proxy server 30 (IP address, etc.). Such software communicates with a host computer in the external network N via the proxy server 30.

However, in the present embodiment, from the viewpoint of a higher security, the image forming apparatus 10 does not store the setting information of the proxy server 30. In such a case, typically, it is necessary to directly and manually input parameters such as setting values by a user via a user interface of an extended application. Note that, if the image forming apparatus 10 stores the manually input parameters, a user does not need to manually input the parameters when the user uses the proxy server 30 in the future. However, from the viewpoint of security, in the present embodiment, to store parameters is restricted.

If the image forming apparatus 10 is not allowed to use an extended application, which uses the cloud service 40 in the external network N, it is not user-friendly. In the present embodiment, the following operational flow enables use of an extended application that uses the cloud service 40.

6. Operational Flow of Image Forming Apparatus and User Terminal

Figure 4:
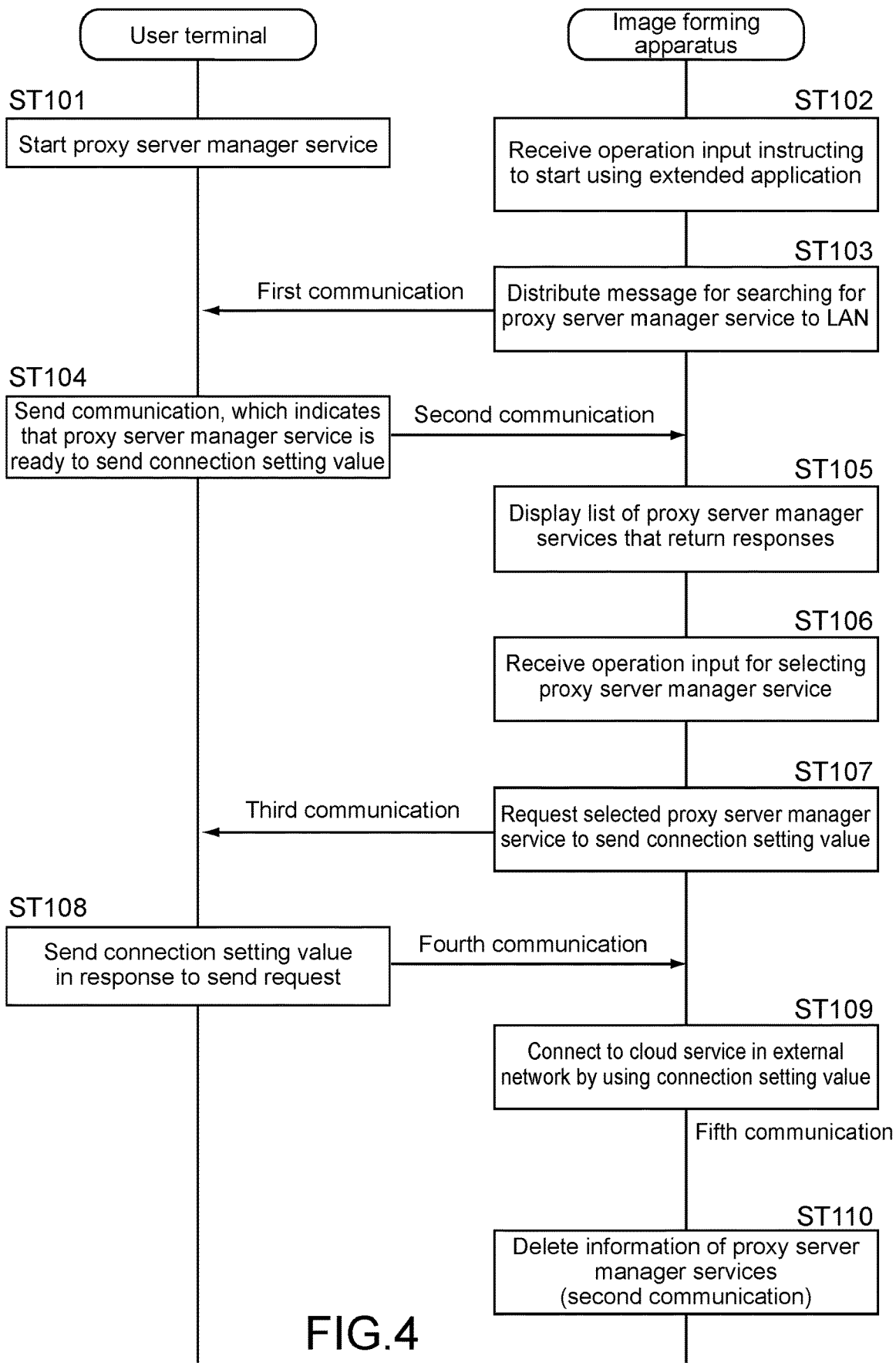
FIG. 4 shows an operational flow of the image forming apparatus and the user terminal.

FIG. 4 shows an operational flow of the image forming apparatus and the user terminal.

Firstly, the controller circuitry 200 of the user terminal 20 starts a proxy server manager service in response to a user operation (Step ST101).

Further, the controller circuitry 11 of the image forming apparatus 10 also receives an operation or the like input from a user, which instructs to start using an extended application (Step ST102). The instruction to start using the extended application may be triggered by an operation input in the operation device 17 by a user. Alternatively, the instruction to start using the extended application may be triggered by insertion of a mobile storage medium, which stores the extended application, in a reader of a mobile storage medium (USB memory, etc.) (not shown).

The controller circuitry 11 of the image forming apparatus 10 determines that there is an instruction to start using, and then distributes a message for searching for the proxy server manager service to the LAN (Step ST103). The message distributing communication will be referred to as "first communication". The first communication is broadcasting. The controller circuitry 11 broadcasts the message to the devices connected to the LAN all at once.

The user terminal 20 including the proxy server manager service receives the first communication, and returns a response in reply. By executing the proxy server manager service, the controller circuitry 200 sends a communication, which indicates that the proxy server manager service is ready to send the connection setting value, to the image forming apparatus 10 (Step ST104). The communication, which indicates that the proxy server manager service is ready to send the connection setting value, will be referred to as "second communication".

In Step ST103, the image forming apparatus 10 distributes a message, in which the extended application and the user are specified, to the LAN. In Step ST104, the user terminal 20 returns the second communication only if the user terminal 20 has a connection setting value corresponding to the extended application of the first communication. If the user terminal 20 is not ready to send a connection setting value, the user terminal 20 does not return the second communication. Further, the user terminal 20 may return the second communication only if a user specified via the first communication logs in to the user terminal 20. In this case, the system 1 has a higher security.

The controller circuitry 11 of the image forming apparatus 10 creates a list of the proxy server manager services (or may be the user terminals 20) that return responses for the first communication, and displays the list on the display device 17a (Step ST105).

Next, the controller circuitry 11 receives an operation input via the operation device 17 for selecting one of the proxy server manager services displayed in the list (Step ST106).

Next, the controller circuitry 11 requests the proxy server manager service selected in Step ST106 to send a connection setting value (Step ST107). The communication, which requests to send a connection setting value, will be referred to as "third communication".

The controller circuitry 200 of the user terminal 20 receives the third communication, and then sends the connection setting value in response to the send request (Step ST108). The communication, which sends the connection setting value, will be referred to as "fourth communication".

The controller circuitry 11 of the image forming apparatus 10 receives the connection setting value, and connects to the cloud service 40 in the external network N by using the received connection setting value (Step ST109). Specifically, the controller circuitry 11 of the image forming apparatus 10 sets the IP address and the like of the proxy server 30 for variable items of the extended application based on the proxy server setting information included in the connection setting value, and connects to the cloud service 40 via the proxy server 30. Next, the controller circuitry 11 of the image forming apparatus 10 logs in to the cloud service 40 by using the user ID included in the connection setting value. During the session between the image forming apparatus 10 and the cloud service 40, the image forming apparatus 10 and the cloud service 40 may send and receive multiple data. The communication in which the image forming apparatus 10 connects to the cloud service 40 will be referred to as "fifth communication".

After the fifth communication is finished, the controller circuitry 11 deletes the information of the proxy server manager services, which are included in the list displayed in Step ST105 (Step ST110). In this case, the information of the proxy server manager services means the information of the second communications sent from the user terminals 20 in Step ST104 (all the information of the second communications sent from multiple user terminals 20).

If the information of the second communication still remains even after communication via the fifth communication with the cloud service 40 that a user wants to use is enabled, then a third person may have a chance to use the cloud service 40 by using the remaining information of the the second communication in an invalid way. So the controller circuitry 11 deletes the information of the second communication at this timing. Therefore the system 1 has a higher security.

Further, the controller circuitry 11 also deletes the connection setting value obtained via the fourth communication at this timing. Therefore the system 1 has a still higher security.

6. Conclusion

Typically, when a multifunction peripheral (referred to as "MFP"), which is connected to an in-office local area network (referred to as "LAN"), connects to an external network (for example, the Internet) and uses a cloud service, the MFP accesses the external network via a proxy server. The MFP stores setting values of a proxy server such as the IP address of the proxy server, and uses a public service in the external network by using the setting values of the proxy server.

Similarly, an extended application executed by the MFP also uses a public service in the external network by using the setting values of the proxy server. Note that the extended application is an application program that supplies functions of extending or supporting functions of the operating system installed in the MFP.

However, by only using the "setting value of the proxy server" stored in the MFP, the extended application may not capable of accessing the external network or using the full-spec function supplied by the external service. Typically, in such a case, a user directly and manually inputs parameters such as setting values via a user interface of an extended application or an MFP stores the manually input parameters to avoid such problems. However, this method requires a user's burden, and has a low security since an MFP stores parameters.

Accessing to the Internet by an extended application of an MFP has been described as an example. However, this situation is not limited to an MFP.

(1) To the contrary, according to the present embodiment, before an extended application is booted, a user terminal, which is independent of an electronic apparatus in which the extended application is installed, prepares for sending the connection setting value, and sends the connection setting value in response to the request from the electronic apparatus. The extended application connects to the service in an external network by using the received connection setting value. So a user does not need to operate the operation device 17 of the electronic apparatus, which is user-friendly. In addition, the storage device 18 or the like of the electronic apparatus does not need to store setting values, which provides a higher security. In short, the electronic apparatus that executes an extended application, which uses a service in an external network, is user-friendly and has a higher security.

(2) According to the present embodiment, the user terminal sends information, which indicates that the user terminal is ready to send the connection setting value to the electronic apparatus. The electronic apparatus deletes the received information. So the system has a higher security.

(3) According to the present embodiment, the electronic apparatus uses a proxy server and thereby has a higher security. Since the electronic apparatus automatically logs in to the service in the external network, the system is user-friendly.

In the present embodiment, the storage device 18 or the ROM 11c of the image forming apparatus 10 stores the extended application. Alternatively, a mobile storage medium such as a USB memory may store the extended application. In this case, when the mobile storage medium is inserted in the image forming apparatus 10, the platform of the image forming apparatus 10 may automatically detect and start the extended application.

It should be understood by those skilled in the art that various modifications, combinations, sub-combinations and alterations may occur depending on design requirements and other factors insofar as they are within the scope of the appended claims or the equivalents thereof

What is claimed is:

1. An information processing system, comprising:
a user terminal; and
an electronic apparatus communicably connected to the user terminal,
the user terminal including
a memory device configured to store a connection setting value and a manager service, the connection setting value being used to connect to a service in an external network by an extended application of the electronic apparatus, the manager service causing the user terminal to send the connection setting value to the electronic apparatus,
a communication device configured to receive first communication from the electronic apparatus, the first communication being for searching for the manager service, and
a controller circuitry configured to
if the user terminal has the connection setting value corresponding to the extended application of the first communication, control the communication device to send second communication to the electronic apparatus when the communication device receives the first communication, the second communication indicating that the manager service is ready to send the connection setting value to the electronic apparatus, and
control the communication device to send fourth communication to the electronic apparatus when the communication device receives third communication from the electronic apparatus, the third communication requesting to send the connection setting value, the fourth communication sending the connection setting value,
the electronic apparatus including
a memory device configured to store the extended application,
a communication device configured to send the first communication, in which the extended application is specified by the electronic apparatus, when the electronic apparatus starts the extended application, and
a controller circuitry configured to
where the communication device receives the second communication from one or more manager services, control to display a list of the one or more manager services that sent the second communication,
control the communication device to send the third communication to a manager service displayed on the list and selected by a user, and
where the connection setting value is received via the fourth communication, control the extended application to execute fifth communication, the fifth communication connecting to the service in the external network by using the connection setting value.

2. The information processing system according to claim 1, wherein
the controller circuitry of the electronic apparatus is configured to, after the fifth communication, delete, from the electronic apparatus, information of the second communication received from the one or more user terminals.

3. The information processing system according to claim 1, wherein
the connection setting value includes setting information of a proxy server and authentication information, the proxy server being configured to execute communication with the service in the external network as a proxy of the electronic apparatus, the authentication information being used to log in to the service in the external network.

4. A user terminal communicably connected to an electronic apparatus,
the user terminal including
a memory device configured to store a connection setting value and a manager service, the connection setting value being used to connect to a service in an external network by an extended application of the electronic apparatus, the manager service causing the user terminal to send the connection setting value to the electronic apparatus,
a communication device configured to receive first communication from the electronic apparatus, the first communication being for searching for the manager service, and
a controller circuitry configured to
if the user terminal has the connection setting value corresponding to the extended application of the first communication, control the communication device to send second communication to the electronic apparatus when the communication device receives the first communication, the second communication indicating that the manager service is ready to send the connection setting value to the electronic apparatus, and control the communication device to send fourth communication to the electronic apparatus when the communication device receives third communication from the electronic apparatus, the third communication requesting to send the connection setting value, the fourth communication sending the connection setting value, the electronic apparatus including a memory device configured to store the extended application, a communication device configured to send the first communication, in which the extended application is specified by the electronic apparatus, when the electronic apparatus starts the extended application, and a controller circuitry configured to where the communication device receives the second communication from one or more manager services, control to display a list of the one or more manager services that sent the second communication, control the communication device to send the third communication to a manager service displayed on the list and selected by a user, and where the connection setting value is received via the fourth communication, control the extended application to execute fifth communication, the fifth communication connecting to the service in the external network by using the connection setting value.

5. An electronic apparatus communicably connected to a user terminal, the user terminal including a memory device configured to store a connection setting value and a manager service, the connection setting value being used to connect to a service in an external network by an extended application of the electronic apparatus, the manager service causing the user terminal to send the connection setting value to the electronic apparatus, a communication device configured to receive first communication from the electronic apparatus, the first communication being for searching for the manager service, and a controller circuitry configured to if the user terminal has the connection setting value corresponding to the extended application of the first communication, control the communication device to send second communication to the electronic apparatus when the communication device receives the first communication, the second communication indicating that the manager service is ready to send the connection setting value to the electronic apparatus, and control the communication device to send fourth communication to the electronic apparatus when the communication device receives third communication from the electronic apparatus, the third communication requesting to send the connection setting value, the fourth communication sending the connection setting value, the electronic apparatus including a memory device configured to store the extended application, a communication device configured to send the first communication, in which the extended application is specified by the electronic apparatus, when the electronic apparatus starts the extended application, and a controller circuitry configured to where the communication device receives the second communication from one or more manager services, control to display a list of the one or more manager services that sent the second communication, control the communication device to send the third communication to a manager service displayed on the list and selected by a user, and where the connection setting value is received via the fourth communication, control the extended application to execute fifth communication, the fifth communication connecting to the service in the external network by using the connection setting value.

* * * * *